US008725169B2

(12) United States Patent
Xiao et al.

(10) Patent No.: US 8,725,169 B2
(45) Date of Patent: May 13, 2014

(54) METHOD AND APPARATUS FOR DETERMINING MOBILITY STATE OF TERMINAL

(71) Applicant: Huawei Technologies Co., Ltd., Shenzhen (CN)

(72) Inventors: Dengkun Xiao, Shenzhen (CN); Peng Yuan, Shenzhen (CN); Anjian Li, Shenzhen (CN); Yuan He, Shenzhen (CN); Jing Han, Shenzhen (CN); Chunfeng Yao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/662,058

(22) Filed: Oct. 26, 2012

(65) Prior Publication Data
US 2013/0053065 A1 Feb. 28, 2013

Related U.S. Application Data

(63) Continuation of application No. PCT/CN2011/073456, filed on Apr. 28, 2011.

(30) Foreign Application Priority Data

Apr. 28, 2010 (CN) .......................... 2010 1 0158450

(51) Int. Cl.
*H04W 24/00* (2009.01)
(52) U.S. Cl.
USPC ........ 455/456.1; 455/436; 455/438; 455/458; 455/428; 455/444; 455/69; 455/524
(58) Field of Classification Search
USPC ................ 455/436, 438, 458, 39, 428, 456.5, 455/456.1, 13.1, 444, 69, 524; 370/336, 370/293, 315, 279, 350
See application file for complete search history.

(56) References Cited

U.S. PATENT DOCUMENTS 6,728,522 B1 * 4/2004 Marrah et al. ............. 455/179.1
7,031,726 B2 * 4/2006 Cheng ........................ 455/456.1
(Continued)

FOREIGN PATENT DOCUMENTS

CN 1867176 A 11/2006
CN 101557625 A 10/2009
(Continued)

OTHER PUBLICATIONS

Written Opinion of the International Searching Authority issued in corresponding PCT Patent Application No. PCT/CN2011/073456, mailed Aug. 4, 2011.

(Continued)

*Primary Examiner* — Joseph Arevalo
(74) *Attorney, Agent, or Firm* — Brinks Gilson & Lione

(57) ABSTRACT

A method and apparatus for determining a mobility state of a terminal is disclosed in embodiments of this invention, which relates to the technical field of wireless communication and is capable of accurately estimating a mobility state of a terminal in a complex network structure, configuring more appropriate network parameters for the terminal, optimizing mobility performance of the terminal and improving overall network performance. A method for determining a mobility state of a terminal is provided in an embodiment of this invention, including: calculating a total moving distance of a terminal in a predetermined period by using a distance estimation strategy; and determining a mobility state of the terminal according to the total moving distance. This invention is applicable to estimation of the terminal's mobility state in a homogeneous network and a heterogeneous network.

9 Claims, 6 Drawing Sheets

(56) References Cited

U.S. PATENT DOCUMENTS

| | | | |
|---|---|---|---|
| 7,373,155 B2* | 5/2008 | Duan et al. | 455/456.2 |
| 7,920,870 B1* | 4/2011 | Bhatia et al. | 455/444 |
| 8,140,006 B2* | 3/2012 | Song et al. | 455/13.1 |
| 8,467,963 B2* | 6/2013 | Chen et al. | 701/500 |
| 2005/0215268 A1* | 9/2005 | Cheng | 455/456.1 |
| 2006/0128399 A1* | 6/2006 | Duan et al. | 455/456.5 |
| 2006/0199580 A1 | 9/2006 | Zhang | |
| 2007/0042770 A1* | 2/2007 | Yasui et al. | 455/428 |
| 2007/0077885 A1* | 4/2007 | Schreiber | 455/39 |
| 2008/0119209 A1* | 5/2008 | Upp | 455/458 |
| 2009/0083228 A1* | 3/2009 | Shatz et al. | 707/3 |
| 2009/0098873 A1* | 4/2009 | Gogic | 455/436 |
| 2009/0143093 A1 | 6/2009 | Somasundaram et al. | |
| 2009/0213920 A1 | 8/2009 | Yip et al. | |
| 2010/0075716 A1 | 3/2010 | Chang et al. | |
| 2010/0198496 A1* | 8/2010 | Victor et al. | 701/201 |
| 2011/0019649 A1* | 1/2011 | Dayal et al. | 370/336 |
| 2011/0112761 A1* | 5/2011 | Hurley et al. | 701/204 |
| 2011/0153196 A1* | 6/2011 | Chen et al. | 701/201 |
| 2012/0042726 A1* | 2/2012 | Jeon et al. | 73/490 |
| 2012/0289233 A1* | 11/2012 | Medbo et al. | 455/436 |

FOREIGN PATENT DOCUMENTS

| | | |
|---|---|---|
| CN | 101641925 A | 2/2010 |
| CN | 101686575 A | 3/2010 |
| EP | 1156695 A2 | 11/2001 |
| WO | WO 2005018148 A1 | 2/2005 |
| WO | WO 2007091837 A1 | 8/2007 |
| WO | WO 2009056028 A1 | 5/2009 |

OTHER PUBLICATIONS

International Search Report issued in corresponding PCT Patent Application No. PCT/CN2011/073456, mailed Aug. 4, 2011.

LTE, "3$^{rd}$ Generation Partnership Project; Technical Specification Group Radio Access Network; Evolved Universal Terrestrial Radio Access (E-UTRA); User Equipment (UE) Procedures in Idle Mode" (Release 9) 3GPP TS 36.304. V9.0.0, Sep. 2009.

Extended European Search Report issued in corresponding European Patent Application No. 11774400.3, mailed Mar. 8, 2013.

Office Action issued in corresponding Chinese Patent Application No. 201010158450.5, mailed Mar. 8, 2013.

* cited by examiner

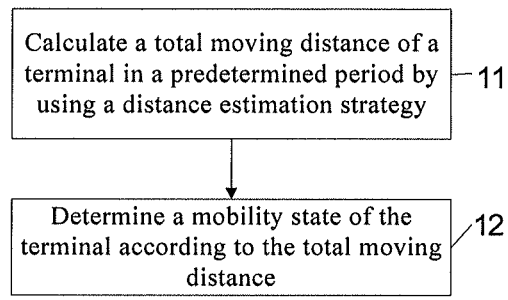
FIG.1
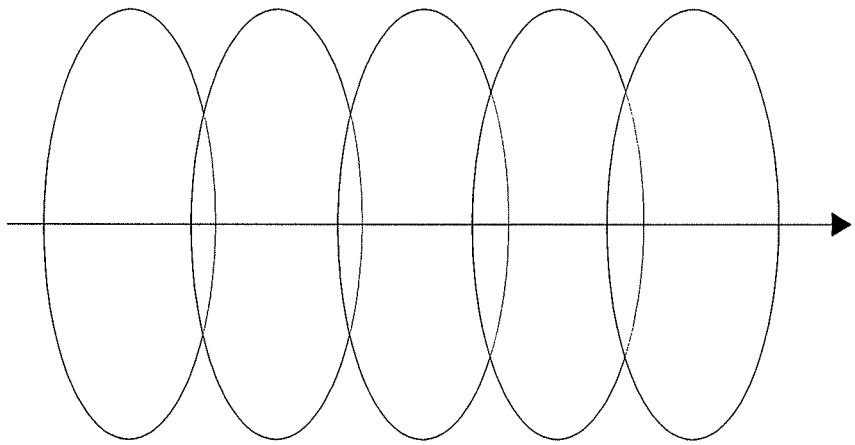
FIG.2 ( a )
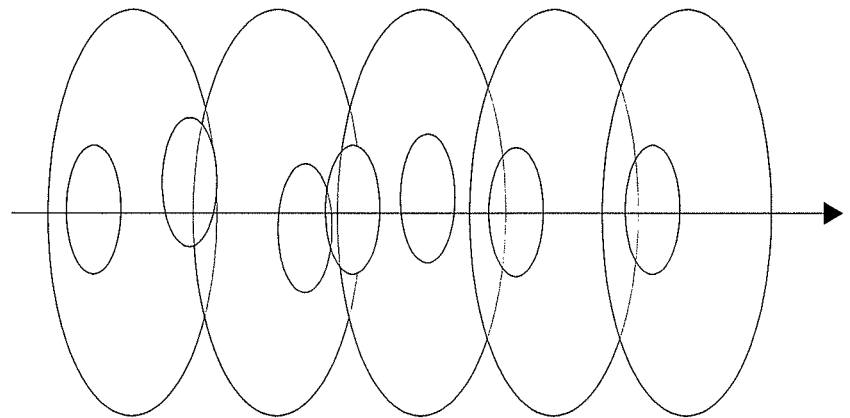
FIG.2 ( b )

US 8,725,169 B2

METHOD AND APPARATUS FOR DETERMINING MOBILITY STATE OF TERMINAL

CROSS-REFERENCE TO RELATED APPLICATIONS

This application is a continuation of Internet Application No. PCT/CN2011/073456, filed on Apr. 28, 2011, which claims the priority to Chinese Patent Application No. 201010158450.5, filed on Apr. 28, 2010, both of which are hereby incorporated by reference in there entireties.

FIELD OF TECHNOLOGY

The present invention relates to the field of a wireless communication technology, and in particular, to a method and apparatus for determining a mobility state of a terminal.

BACKGROUND

With development of a mobile communication technology, a user equipment (User Equipment, UE) moving speed that can be supported by a wireless communication system may also be higher and higher. Upon entering the stage of long term evolution (Long-term Evolution, LTE), UE speed that can be supported by a communication system has reached at least 350 km/h.

In the prior art, when a mobility state (Mobility State) of a UE is estimated, the times of cell reselections performed by the UE in a specified period ($T_{CRmax}$) is recorded, and then the recorded times of cell reselections is compared with a predetermined threshold (such as $N_{CR-M}$, $N_{CR-H}$) so that the mobility state of the UE is determined, such as Normal, High.

However, there are many defects in the prior art, for example, a heterogeneous network introduced in a LTE-A system increases network structure complexity. Methods for estimating the mobility state provided in the prior art cannot accurately estimate the mobility state of the UE.

SUMMARY

In order to resolve a problem in the prior art, a method and apparatus for determining a mobility state of a terminal are provided in embodiments of this invention, for accurately estimating the mobility state of the terminal in a complex network structure.

In order to achieve the aforementioned object, the following technical solutions are adopted in the embodiments of this invention:

a method for determining mobility state of a terminal comprises:

calculating a total moving distance of a terminal in a predetermined period by using a distance estimation strategy; and determining a mobility state of the terminal according to the total moving distance.

An apparatus for determining a mobility state of a terminal comprises:

a moving distance calculation unit configured to calculate a total moving distance of a terminal in a predetermined period by using a distance estimation strategy; and a mobility state determination unit configured to determine a mobility state of the terminal according to the total moving distance.

In the technical solution provided in embodiments of this invention, by calculating a total moving distance of a terminal in a predetermined period, a method for accurately estimating a mobility state of the terminal in a complex network structure is provided, so that a more appropriate network parameter can be configured for the terminal according to the mobility state, mobility performance of the terminal is optimized, and overall performance of a network is enhanced.

A method for determining a mobility state of a terminal comprises:

counting the number of serving cells that a terminal passed through during a predetermined period, wherein if a present serving cell and a last serving cell are within the same macro cell coverage area, the present serving cell is not counted; and determining a mobility state of the terminal according to the number of the serving cells.

An apparatus for determining a mobility state of a terminal comprises:

a cell counting unit configured to count the number of serving cells that a terminal passed through in a predetermined period, wherein if a present serving cell and a last serving cell are within the same macro cell coverage area, the present serving cell is ignored; and a mobility state determination unit configured to determine a mobility state of the terminal according to the number of the serving cells.

In the technical solution provided in the embodiments of this invention, taking characteristics of different serving cells in a heterogeneous network into account, by selectively counting the number of serving cells that a terminal passed through in a predetermined period, a method for accurately estimating a mobility state of a terminal in a complex network structure is provided, so that a more appropriate network parameter can be configured for the terminal according to the mobility state, terminal mobility performance is optimized and overall performance of a network is enhanced.

BRIEF DESCRIPTION OF THE DRAWINGS

To illustrate the technical solutions in embodiments of this invention or the prior art more clearly, accompanying drawings needed in the embodiments or the prior art are briefly introduced in the following. Obviously, the accompanying drawings described in the following description are merely a plurality of embodiments of the invention, and for those of ordinary skill in the art, other accompanying drawings can be derived from these without any creative efforts.

FIG. 1 is a schematic diagram of a method for determining a mobility state of a terminal provided in an embodiment of this invention;

FIG. 2 (a) is a simplified schematic diagram of a UE moving in a homogeneous network provided in an embodiment of this invention;

FIG. 2 (b) is a simplified schematic diagram of a UE moving in a heterogeneous network provided in an embodiment of this invention;

DETAILED DESCRIPTION

A clear and complete description of technical solutions of embodiments of this invention will be given with reference to the accompanying drawings of the embodiments of this invention. Obviously, embodiments described herein are merely some embodiments of this invention, but not all of embodiments. Based on those embodiments of this invention, all of the other embodiments can be obtained without any creative efforts by those of ordinary skill in the art, and all of the embodiments fall within the scope of this invention.

A method for determining a mobility state of a terminal is provided in an embodiment of this invention, referring to FIG. 1, comprising:

Step 11: Calculate a total moving distance of a terminal in a predetermined period by using a distance estimation strategy.

Step 12: Determine a mobility state of the terminal according to the total moving distance.

Figure 3:
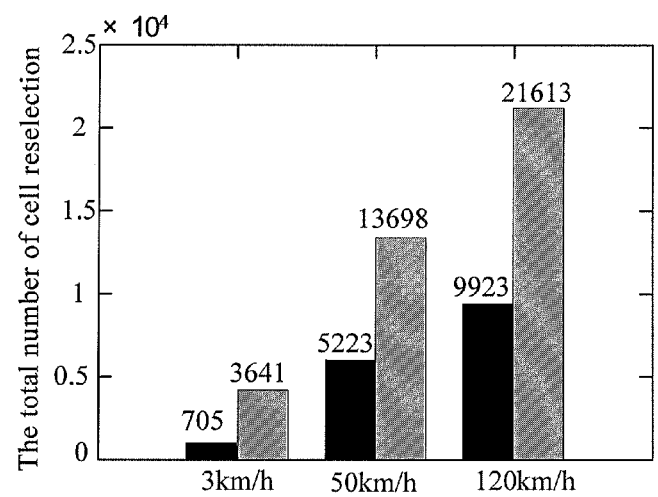
FIG. 3 is a comparative diagram of estimating the mobility state for a UE in a homogeneous network and a heterogeneous network in the prior art.

The technical solutions of embodiments of this invention address problems in the prior art. Referring to FIG. 2 (*a*) and FIG. 2 (*b*), it can be clearly recognized that if a UE passes through two networks at the same speed and the same direction, in the same period, the times of cell reselections performed by the UE in a heterogeneous network is far greater than the times of cell reselections performed by the UE in a homogeneous network. Methods for estimating a mobility state provided in the prior art may cause higher-estimation of the mobility state of UE in heterogeneous networks, which is distinctly illustrated in the histogram of FIG. 3. In FIG. 3, striped columns represent a statistic, according to the prior art, on the times of cell reselections performed by a UE when moving in a heterogeneous network in a period, and non-striped columns represent a statistic, according to the prior art, on the times of cell reselections performed by the UE when moving in a homogeneous network in the same period It can be seen that the times of cell reselections performed by the UE at a 50 km/h speed in the heterogeneous network is even significantly larger than the times of cell reselections performed by the UE at a 120 km/h speed in the homogeneous network. Thus, according to the prior art, it is impossible to accurately estimate a mobility state of a UE in the heterogeneous network.

Figure 4:
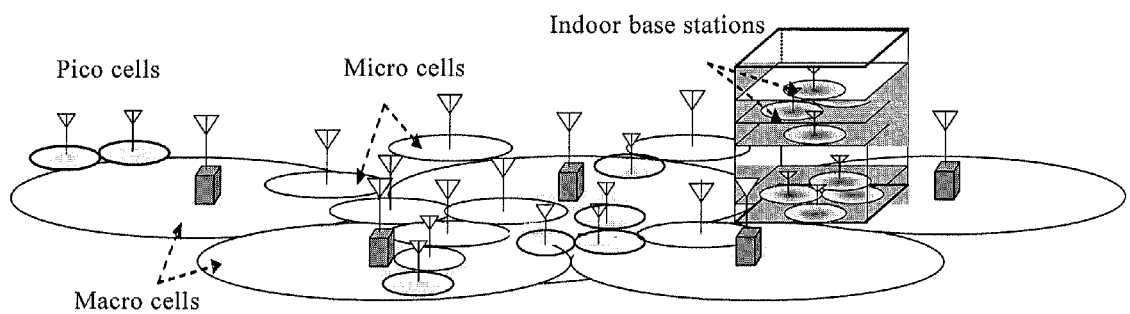
FIG. 4 is a schematic diagram of an application scenario of an embodiment of this invention.

The technical solutions provided in embodiments of this invention can be applied in a heterogeneous network. With the appearance of LTE-A systems, for the purpose of enlarging high data rate coverage, extending temporary network coverage, patching coverage gaps and blind spaces and improving throughput at cell edges, etc., low power nodes, such as hotspot (Pico), home E-UTRAN nodeB (Home E-UTRAN NodeB, HeNB) and relay (Relay), are deployed within macro base station cells, and the network heterogeneity introduced thereby makes network structures of wireless communication systems more complex. Referring to FIG. 4, an application scenario of an embodiment of this invention is shown.

The mobility state of a terminal (such as UE) mentioned above varies with network architectures. For example, in a universal mobile telecommunication system (Universal Mobile Telecommunication System, UMTS), the mobility state of a UE is classified into two types: normal (Normal) and high speed (High); in a LTE system, the mobility state of a UE is further classified into three types: normal (Normal), medium (Medium), and high speed (High).

Further, the distance estimation strategy mentioned above may comprise: when the type of the present serving cell of a terminal is a first power cell, and if the type of a previous serving cell is a first power cell, and the type of the one before the previous serving cell is also a first power cell, using a diameter of the previous serving cell as the moving distance of the terminal resulted by estimation at this time; otherwise, the moving distance estimation at this time is skipped;

when the type of the present serving cell of the terminal is a second power cell, using the distance between the center of the present serving cell and the center of the previous serving cell as the moving distance of the terminal resulted by the estimation at this time;

wherein the power of the first power cell is higher than the power of the second power cell. The first power cell mainly refers to a traditional high power cell, and the second power cell mainly refers to a low power cell in a heterogeneous network.

With the technical solutions provided in embodiments of this invention, by calculating the total moving distance of the terminal in the predetermined period, the method for accurately estimating the mobility state of the terminal in a complex network structure is provided, so that a more appropriate network parameter can be configured for the terminal according to the mobility state, mobility performance of the terminal is optimized and overall network performance is improved.

Figure 5:
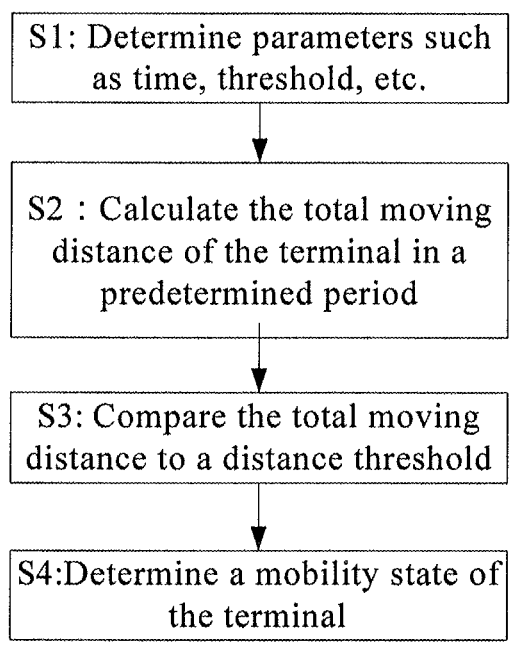
FIG. 5 is a schematic diagram of a method for determining mobility state of a terminal provided in another embodiment of this invention.

Below, a method for determining a mobility state of a terminal provided in another embodiment of this invention will be described in detail. Referring to FIG. 5, the method comprises following processes.

Step S1: Determine relevant parameters about a length of time and a threshold, and so on.

A network system can determine required parameters according to the adopted distance estimation strategy and system requirements, for example, the length of a predetermined period for estimating a moving distance, and a threshold for distinguishing the mobility states of a terminal.

After determining the above parameters, the network system sends the parameters to a terminal, such as a UE, and the UE calculates a total moving distance in the predetermined period according to these parameters.

Step S2: Calculate the total moving distance of the terminal in a predetermined period by using the distance estimation strategy.

In a predetermined period, with a distance estimation strategy, the embodiment of this invention calculates moving distances of a terminal from one serving cell to a next serving cell, respectively, and the total moving distance is obtained by summing up those moving distances.

The embodiment of this invention can confirm that the terminal moves from one serving cell to the next serving cell by means of cell reselection, cell handover, and other operations of the terminal performed during moving.

In order to realize seamless coverage for the network, corresponding operations that require completing by a terminal during the moving comprises: cell selection when the terminal is in an idle state (RRC-IDLE state), cell reselection when the terminal is in the RRC-IDLE state, and cell handover when the terminal is in a connection state (RRC-CONNECTED state), and other mobility associated processes. When the cell reselection is performed by a terminal in the RRC-IDLE state or the cell handover is performed by a terminal in the RRC-CONNECTED state, it can be confirmed that the terminal has moved from one serving cell to another serving cell. Hereinafter, the description will mainly be given with the cell reselection outperformed by a terminal as an example. However, this invention does not limited thereto, and the detection of the mobility state of a terminal can be triggered by using any information capable of indicating that the terminal moves from one serving cell to another serving cell.

In the embodiment of this invention, cells in a heterogeneous network are classified into first power cells and second power cells. In the embodiment of this invention, terms such as "first", "second" are used to distinguish identical items or similar items that have substantially the same functions and effects, those skilled in the art may appreciate that terms "first", "second" and the like do not limit in terms of the times and the execution sequence.

Figure 6:
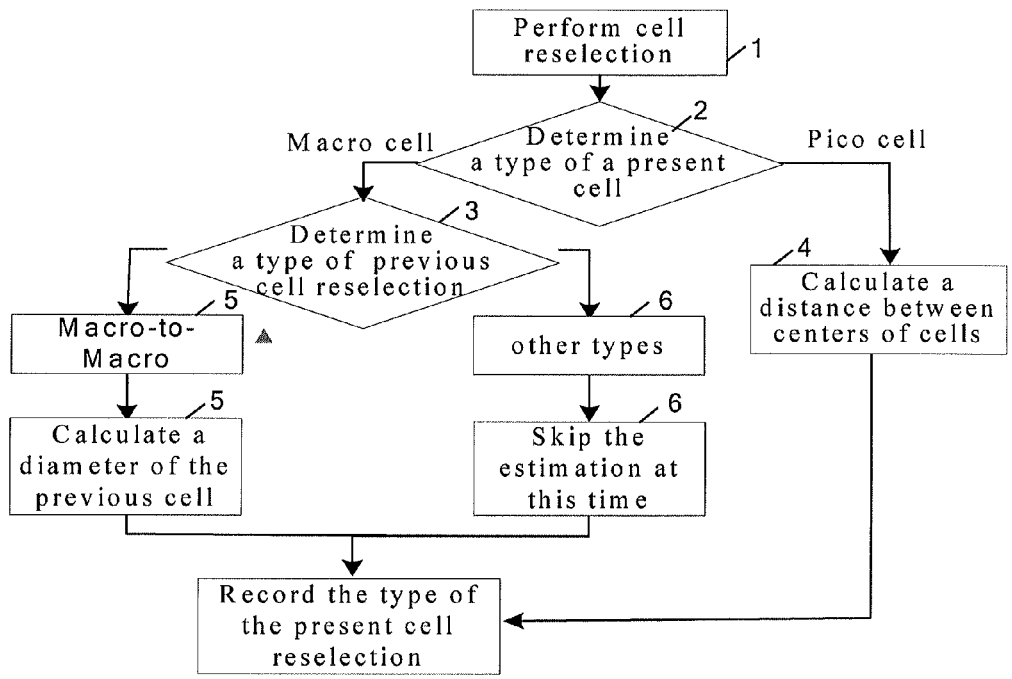
FIG. 6 is a schematic diagram of a method for calculating moving distance of a terminal provided in still another embodiment of this invention.

The first power cell comprises a traditional high power cell, such as a macro cell (Macro cell), and the second power cell comprises a low power cell in the heterogeneous network, such as a micro cell (Micro cell) and a pico cell (Pico cell). For the clear description of technical solutions of embodiments of this invention, in the embodiment of this invention, an illustration will be given with an example in which the first power cell is a macro cell and the second power cell is a pico cell. At that point, when the terminal carries out cell reselection (or cell handover), the type of cell reselection (or cell handover) of the terminal are classified into four types according to the types of a previous serving cell and a present serving cell, namely Macro-to-Macro, Macro-to-Pico, Pico-to-Pico, and Pico-to-Macro. Below, the description will be given in a scenario of the cell reselection. Below, a method for calculating a moving distance of a terminal will be discussed for these four types, and referring to FIG. 6, the method mainly comprises the following steps.

1: Upon a terminal performs a cell reselection at each time, the calculation of the moving distance of the terminal is initiated.

Note that when the terminal is in the RRC-IDLE state, the above calculation is triggered by the cell reselection, and when the terminal is in a RRC-CONNECTED state, the above calculation is triggered by the cell handover. The embodiment of this invention will be described in a scenario of cell reselection as an example.

2: The terminal detects and acquires the type of the present serving cell which the terminal homes to. That is, it is determined whether the present serving cell is a macro cell or a pico cell, if it is a macro cell, the process proceeds to step 3, and if it is a pico cell, the process proceeds to step 4.

3: If the present serving cell is a macro cell, the terminal needs to further determine the type of a previous serving cell and the type of a serving cell before the previous serving cell, i.e., the terminal needs to determine the type of the previous cell reselection of the terminal. When the type of the previous serving cell is a macro cell and the type of the serving cell before the previous serving cell is also a macro cell, i.e., if the type of the previous cell reselection is Macro-to-Macro, the process proceeds to step 6.

Figure 7:
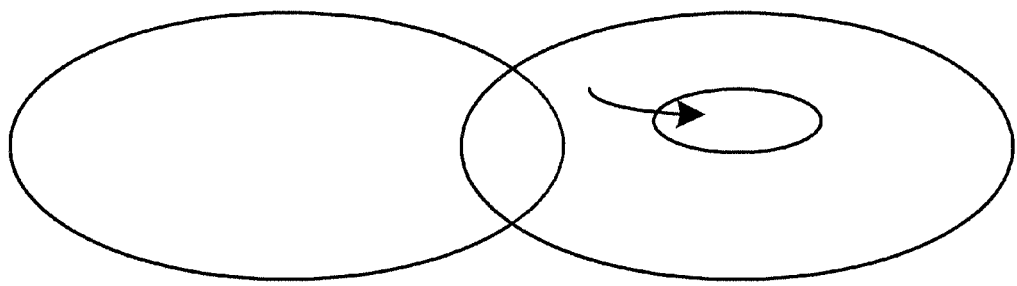
FIG. 7 is a schematic diagram showing a terminal moving into a low power cell provided in yet another embodiment of this invention.

4: If the terminal has moved into a pico cell currently, referring to FIG. 7, the present serving cell of the terminal is a low power cell, and the distance between the center of the present serving cell and the center of the previous serving cell is used as the moving distance of the terminal resulted by the estimation at this time. The total moving distance is updated by adding this moving distance of the terminal to a present value of the total moving distance.

That is, when the terminal reselects a low power cell, the type of the previous cell reselection of the terminal is no longer considered, the distance between centers of the two cells is used as the moving distance that is resulted by the estimation at this time and is between the cell reselection performed by the terminal at this time and the cell reselection performed by the terminal at last time (a moving distance from the previous serving cell to the present serving cell), and the final moving distance of the terminal is updated by using the moving distance. Various methods can be adopted to calculate the distance between a present serving cell and a previous serving cell. For example, coordinate information of the center of the serving cell can be carried in a system message sent to the terminal from a base station, and the terminal can calculate the above distance according to the coordinate information of the center of the present serving cell and the coordinate information of the center of the previous serving cell center, and use the distance as the moving distance of the terminal resulted by the estimation.

Figure 8:
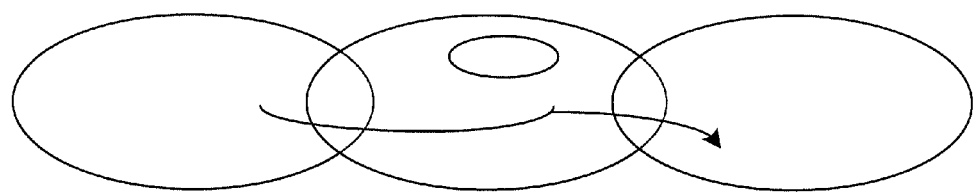
FIG. 8 is a schematic diagram showing a terminal passing through a macro cell provided in yet another embodiment of this invention.

5: If the present serving cell of the terminal is a macro cell, and the previous serving cell and the serving cell before the previous serving cell are both macro cells, that is, if the type of cell reselection of the terminal at the last time is Macro-to-Macro, referring to FIG. 8, in this case, the terminal has passed through a macro cell without being reselected or handed over to any low power cell during moving in the heterogeneous network. At that point, the diameter of the previous serving cell is used as the moving distance of the terminal resulted by the estimation at this time, and the total moving distance is updated by adding this moving distance to the present value of the total moving distance.

6: If the present serving cell of the terminal is a macro cell, and the type of the cell reselection of the terminal at last time is Macro-to-Pico, Pico-to-Pico, or Pico-to-Macro, at that point, the estimation of the moving distance of the terminal at this time is skipped and the total moving distance of the terminal will not be updated.

However, the type of the present serving cell of the terminal must be recorded no matter which type of the present serving cell of the terminal is, that is, the type of the cell reselection of the terminal at this time is recorded, meanwhile, a previous serving cell of the terminal is stored, so that the type of the cell reselection at this time can be acquired during a subsequent process of determining the mobility state of the terminal. And the moving distance of the terminal from the present serving cell to a next serving cell is calculated according to the type of the cell reselection at this time and the type of the next serving cell.

In a predetermined period, the above steps are performed at the occurrence of cell reselection at each time, and the total moving distance of the terminal is updated with respective moving distances. Then, the mobility state of the terminal is determined according to the total moving distance.

Step S3: Compare the total moving distance with a predetermined distance threshold.

The number of the above distance thresholds is determined depending on the number of types that mobility states of the terminal are classified into. For example, when the mobility state of a terminal is classified into two types (normal and high speed), it is enough to merely configure one distance threshold; when the mobility states of the terminal are classified into three types (normal, medium, and high speed), two distance thresholds are required. The embodiment of this invention will be described with an example in which a first distance threshold is configured.

Step S4: Determine a mobility state of the terminal.

For example, when the total moving distance of the terminal is larger than the first distance threshold, the mobility state of the terminal is determined as high speed; when the total moving distance of the terminal is less than the first distance threshold, the mobility state of the terminal is determined as normal.

In order to realize seamless coverage by a network, configuration of a plurality of related network parameters may be involved during the moving process of the terminal, such as $T_{reselection}$ (time for estimating signal quality of a target cell when executing cell reselection), $Q_{Hyst}$ (a margin by which the signal strength of the target cell is larger than the signal strength of a resident cell), time to trigger (Time to Trigger, TTT), and a hysteresis value (Hysteresis, Hys), etc. In a network, when a terminal is at different speeds, the configuration of these parameters should be correspondingly adjusted to optimize mobility performance, for example, when a terminal is at a high speed and is in a RRC-IDLE state, compared to a situation that the terminal is in a low speed state, $T_{reselection}$ should be set to a smaller value while $Q_{Hys}$ should be set to a larger value, so that the UE can be reselected to the target cell faster. Because technical solutions provided by embodiments of this invention can accurately estimate the mobility state of the terminal and these parameters are configured more appropriately according to the mobility state, so that the mobility performance of the system is significantly improved.

With the technical solutions provided in embodiments of this invention, by calculating a total moving distance of a terminal in a predetermined period, a method for accurately estimating a mobility state of a terminal in a complex network structure is provided, so that more appropriate network parameters can be configured for the terminal according to the mobility state, the mobility performance of the terminal is optimized, and the overall network performance is improved.

A method for determining a mobility state of a terminal is further provided in still another embodiment of this invention, comprising:

counting the number of serving cells that a terminal has passed in a predetermined period, wherein if a present serving cell and a previous serving cell are located within a coverage area of the same macro cell, the present serving cell is ignored; and determining a mobility state of the terminal according to the number of the serving cells.

The serving cell that the terminal has passed mainly refers to the serving cell to which the terminal is reselected or handed over.

In embodiments of this invention, the number of serving cells that the terminal has passed also can be counted by cell reselection or cell handover. However, when a present serving cell and the previous serving cell belong to the coverage area of the same macro cell, the present serving cell is not counted. That is to say, cell reselection (or cell handover) at this time will be counted only if the cell reselection (or cell handover) performed by the terminal occurs in coverage areas that belongs to two different macro cells.

Figure 9:
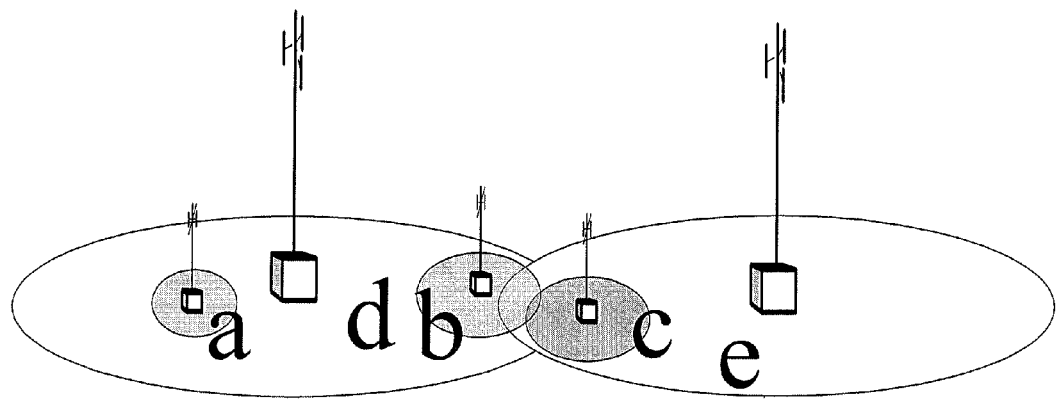
FIG. 9 is a schematic diagram of a heterogeneous network provided in yet another embodiment of this invention.

For the convenience of the understanding of "coverage areas that belongs to different macro cells", a description will be given in connection with FIG. 9 below. It can be seen from FIG. 9 that three low power cells a, b, and c are respectively located within coverage areas of different macro cells; a and b are located within the coverage area of a macro cell d, while c is located within the coverage area of a macro cell e. As to macro cells d and e, they can be considered as being covered by themselves.

Further, a cell identification code (Cell ID) or other information having a similar function can be used to determine the coverage area of the macro cell which a serving cell belongs to. If cell identification information of a present serving cell is as same as that of a previous serving cell, it is determined that the present serving cell and the previous serving cell belong to the coverage area of the same macro cell. Herein, cell identification information comprises, but is not limited to, a Cell ID of the macro cell which covers the serving cell; the cell identification information described above may further comprise other information which is capable of indicating the macro cell of the serving cell.

Figure 10:
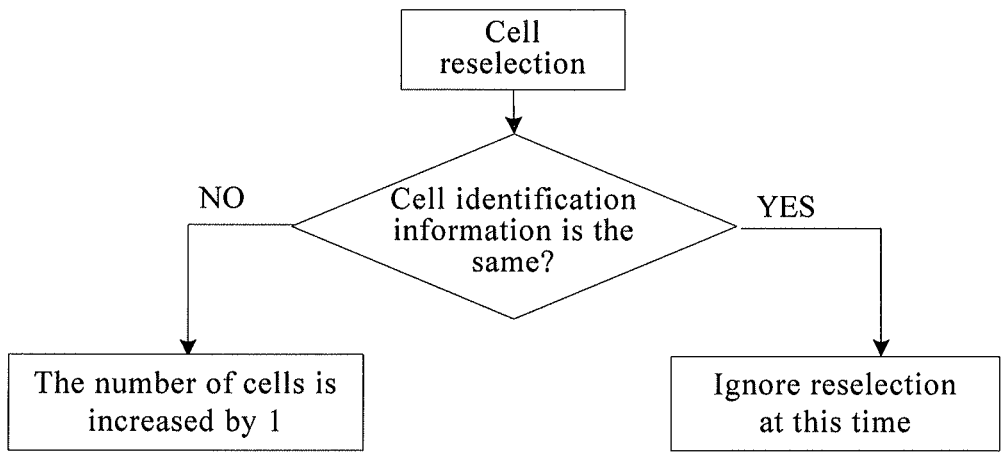
FIG. 10 is a schematic diagram of a method for determining mobility state of a terminal provided in yet another embodiment of this invention.

A particular flowchart of an embodiment of this invention is given in FIG. 10, in which cell reselection is described as an example. Upon the cell reselection is executed by the terminal at each time, it is determined whether the present serving cell and the previous serving cell have the same cell identification information; if the present serving cell and the previous serving cell have the same cell identification information, the cell reselection is ignored at this time, if the present serving cell and the previous serving cell do not have the same cell identification information, the present serving cell is counted, and a present value of the number of cells to which terminal is reselected or handed over is increased by 1.

With the technical solutions provided in embodiments of this invention, taking characteristics of different serving cells in a heterogeneous network into account, by selectively counting the number of serving cells that the terminal has passed in a predetermined period, a method for accurately estimating a mobility state of a terminal in a complex network structure is provided, so that more appropriate network parameters can be configured for the terminal according to the mobility state, the mobility performance of the terminal is optimized and the overall network performance is improved.

Figure 11:
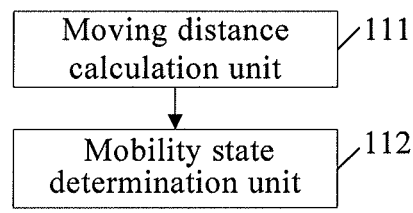
FIG. 11 is a schematic diagram of an apparatus for determining mobility state of a terminal provided in yet another embodiment of this invention.

An apparatus for determining a mobility state of a terminal is provided in still another embodiment of this invention, referring to FIG. 11, the apparatus comprises:

a moving distance calculation unit 111 configured to calculate a total moving distance of a terminal in a predetermined period by using a distance estimation strategy; and a mobility state determination unit 112 configured to determine a mobility state of the terminal according to the total moving distance.

The moving distance calculation unit 111 is particularly configured to, in the predetermined period, estimate a moving distance of the terminal from one serving cell to a next serving cell respectively by using the distance estimation strategy, and sum up the moving distances to obtain the total moving distance.

Further, the distance estimation strategy used by the moving distance calculation unit 111 comprises:

when a type of a present serving cell is a first power cell, and if a type of a previous serving cell is the first power cell and a serving cell before the previous serving cell is also the first power cell, a diameter of the previous serving cell is used as the moving distance of the terminal resulted by estimation at this time; otherwise, the estimation of the moving distance is skipped; when the type of the present serving cell is a second power cell, a distance between a center of the present serving cell and a center of the previous serving cell is used as the moving distance of the terminal resulted by the estimation at this time; wherein power of the first power cell is higher than power of the second power cell. The first power cell comprises a traditional high power cell, such as a macro cell (Macro cell), and the second power cell comprises a low power cell in a heterogeneous network, such as a micro cell (Micro Cell) and a pico cell (Pico cell).

In order to enable the moving distance calculation unit 111 to acquire the type of the corresponding serving cell in time, and to successfully calculate the total moving distance of the terminal described above, the apparatus further comprises a cell type recording unit configured to record the type of the present serving cell and store the type of the previous serving cell, so that the moving distance calculation unit estimates the moving distance of the terminal from the present serving cell to the next serving cell by using the type of the present serving cell, the type of the previous serving cell, and the type of the next serving cell.

Further, the mobility state determination unit 112 is configured to determine the mobility state of the terminal by comparing the total moving distance to at least one predetermined distance threshold.

A communication system is further provided in an embodiment of this invention, which comprises the apparatus for determining a mobility state of a terminal described above.

Refer to the method embodiment of this invention for particular working manners of various function modules and units in the apparatus embodiment of this invention. The function modules and units in the apparatus embodiment of this invention can be separately implemented or can be integrated in one or more units. Refer to the apparatus embodiment of this invention for the apparatus for determining a mobility state of a terminal in the system.

With the technical solutions provided in embodiments of this invention, by calculating a total moving distance of a terminal in a predetermined period, a method for accurately estimating a mobility state of a terminal in a complex network structure is provided, so that more appropriate network parameters can be configured for the terminal according to the mobility state, the mobility performance of the terminal is optimized and the overall network performance is improved.

Figure 12:
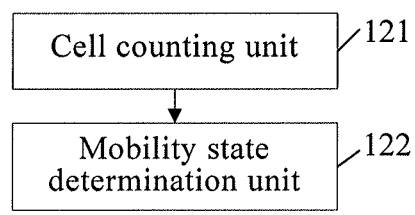
FIG. 12 is a schematic diagram of an apparatus for determining mobility state of a terminal provided in yet another embodiment of this invention.

An apparatus for determining a mobility state of a terminal is provided in yet another embodiment of this invention, referring to FIG. 12, the apparatus comprises:

a cell counting unit 121 configured to count the number of serving cells that a terminal has passed in a predetermined period, wherein when a present serving cell and a previous serving cell belong to a coverage area of the same macro cell, the present serving cell is ignored; and a mobility state determination unit 122 configured to determine a mobility state of the terminal according to the number of the serving cells.

Further the cell counting unit 121 comprises a confirmation module configured to confirm that the present serving cell and the previous serving cell belong to the coverage area of the same macro cell when the present serving cell has the same cell identification information as the previous serving cell, wherein the cell identification information comprises a cell identification code of the macro cell which covers the serving cell.

A communication system is further provided in an embodiment of this invention, which comprises the apparatus for determining a mobility state of a terminal described above. Refer to the apparatus embodiment of this invention for the apparatus for determining a mobility state of a terminal in this system.

Refer to the method embodiment of this invention for particular working manners of various function modules and units in the apparatus embodiment of this invention. The function modules and units in the apparatus embodiment of this invention can be separately implemented or can be integrated in one or more units.

With the technical solutions provided in embodiments of this invention, taking characteristics of different serving cells of a heterogeneous network into account, by selectively counting the number of serving cells that the terminal has passed in a predetermined period, a method for accurately estimating a mobility state of a terminal in a complex network structure is provided, so that more appropriate network parameters can be configured for the terminal according to the mobility state, mobility performance of the terminal is optimized and the overall network performance is improved.

Those skilled in the art can understand clearly that embodiments of the invention can be implemented in a manner of software running on a general-purpose hardware platform. Based upon such understanding, the technical solutions of the embodiments of the invention or a part thereof contributing to the prior art can essentially be embodied in the form of a software product, which can be stored in a storage medium, e.g., an ROM/RAM, a magnetic disk, an optical disk, etc., and which includes a plurality of instructions to cause a computer device (which may be a personal computer, a server, a network device, etc.) to perform the methods according to the respective embodiments of the invention or some parts of the embodiments.

What are described above are merely specific embodiments of the present invention, but do not limit the protection scope of the present invention. Modifications or replacements that are easily figured out by persons skilled in the art within the technical scope of the present invention shall fall within the protection scope of the present invention. Therefore, the protection scope of the present invention is subject to the appended claims.

What is claimed is:

1. A method for determining a mobility state of a terminal, comprising:

a base station calculating a total moving distance of a terminal in a predetermined period by using a distance estimation strategy; and the base station determining a mobility state of the terminal according to the total moving distance, wherein the distance estimation strategy comprises:

when a type of a present serving cell is a first power cell, and a type of a previous serving cell is the first power cell and a type of a serving cell before the previous serving cell is also the first power cell, using a diameter of the previous serving cell as the moving distance of the terminal resulting from the estimation at this time; otherwise, skipping the estimation of the moving distance at this time;

when the type of the present serving cell is a second power cell, using a distance between a center of the present serving cell and a center of the previous serving cell as the moving distance of the terminal resulting from the estimation at this time;

wherein power of the first power cell is higher than power of the second power cell.

2. The method according to claim 1, wherein the step of calculating the total moving distance of the terminal in the predetermined period by using the distance estimation strategy comprises:

in the predetermined period, the base station estimating moving distances of the terminal from one serving cell to a next serving cell respectively by using the distance estimation strategy, and summing up the moving distances to obtain the total moving distance.

3. The method according to claim 2, further comprising:

the base station recording the type of the present serving cell and storing the type of the previous serving cell, to estimate the moving distance of the terminal from the present serving cell to a next serving cell by using the type of the present serving cell, the type of the previous serving cell, and the type of the next serving cell.

4. The method according to claim 1, further comprising:
the base station recording the type of the present serving cell and storing the type of the previous serving cell, to estimate the moving distance of the terminal from the present serving cell to a next serving cell by using the type of the present serving cell, the type of the previous serving cell, and the type of the next serving cell.

5. The method according to claim 1, wherein the step of determining the mobility state of the terminal according to the total moving distance comprises:
the base station determining the mobility state of the terminal by comparing the total moving distance to at least one predetermined distance threshold.

6. An apparatus for determining a mobility state of a terminal, comprising:
a moving distance calculation unit configured to calculate a total moving distance of a terminal in a predetermined period by using a distance estimation strategy; and
a mobility state determination unit configured to determine a mobility state of the terminal according to the total moving distance,
wherein the distance estimation strategy used by the moving distance calculation unit comprises:
when a type of a present serving cell is a first power cell, and a type of a previous serving cell is the first power cell and a type of a serving cell before the previous serving cell is also the first power cell, using a diameter of the previous serving cell as the moving distance of the terminal resulting from the estimation at this time; otherwise, skipping the estimation of the moving distance at this time;
when the type of the present serving cell is a second power cell, using a distance between a center of the present serving cell and a center of the previous serving cell as the moving distance of the terminal resulting from the estimation at this time;
wherein power of the first power cell is higher than power of the second power cell.

7. The apparatus according to claim 6, wherein
the moving distance calculation unit is particularly configured to, in the predetermined period, estimate moving distances of the terminal from one serving cell to a next serving cell respectively by using the distance estimation strategy, and sum up the moving distances to obtain the total moving distance.

8. The apparatus according to claim 6, further comprising:
a cell type recording unit,
wherein the cell type recording unit is configured to record the type of the present serving cell and store the type of the previous serving cell, to enable the moving distance calculation unit to estimate the moving distance of the terminal from the present serving cell to a next serving cell by using the type of the present serving cell, the type of the previous serving cell, and the type of the next serving cell.

9. The apparatus according to claim 6, wherein
the mobility state determination unit is configured to determine the mobility state of the terminal by comparing the total moving distance to at least one predetermined distance threshold.

* * * * *